US012625968B2

(12) United States Patent
Goverdovskii et al.

(10) Patent No.: US 12,625,968 B2
(45) Date of Patent: *May 12, 2026

(54) MICROCONTROLLER UNIT (MCU) SECURE BOOT

(71) Applicant: Verkada Inc., San Mateo, CA (US)

(72) Inventors: Andrei Goverdovskii, San Mateo, CA (US); Nick Pelis, San Francisco, CA (US)

(73) Assignee: Verkada Inc., San Mateo, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 18/514,220

(22) Filed: Nov. 20, 2023

(65) Prior Publication Data

US 2024/0330469 A1     Oct. 3, 2024

Related U.S. Application Data

(63) Continuation of application No. 18/191,748, filed on Mar. 28, 2023, now Pat. No. 11,836,255.

(51) Int. Cl.
G06F 21/57 (2013.01)
H04L 9/08 (2006.01)
(Continued)

(52) U.S. Cl.
CPC .......... G06F 21/575 (2013.01); G06F 21/572 (2013.01); H04L 9/0825 (2013.01);
(Continued)

(58) Field of Classification Search
CPC ................. G06F 21/575; G06F 21/572; G06F 2221/033; H04L 9/0825; H04L 9/3073; H04L 9/3247
See application file for complete search history.

(56) References Cited

U.S. PATENT DOCUMENTS

| 10,997,297 | B1 | 5/2021 | Lin |
| 11,836,255 | B1 | 12/2023 | Goverdovskii et al. |

(Continued)

FOREIGN PATENT DOCUMENTS

| CN | 115509587 A | 12/2022 | |
| WO | WO-2020002441 A1 * | 1/2020 | ............. G06F 21/81 |

OTHER PUBLICATIONS

Silicon Labs. "UG266: Silicon Labs Gecko Bootloader Useras Guide for GSDK 3.2 and Lower", Dec. 2021. (Year: 2021).*

(Continued)

*Primary Examiner* — Michael Simitoski
(74) *Attorney, Agent, or Firm* — COOLEY LLP

(57) ABSTRACT

A method includes building a firmware image to execute on a bootloader of a system on chip (SoC), the firmware image including first encryption public and private keys, and digitally signing the firmware image with a second encryption private key. The signed firmware image is encrypted with a symmetric encryption key, which in turn is encrypted with a second encryption public key. The encrypted signed firmware image and the encrypted symmetric encryption key are sent to the SoC to cause the SoC to (1) decrypt the encrypted symmetric encryption key to produce the symmetric encryption key using a third encryption private key from a first asymmetric key pair, (2) decrypt the encrypted signed firmware image to produce the signed firmware image using the symmetric encryption key, and (3) verify a digital signature of the signed firmware image using a third encryption public key from a second asymmetric key pair.

19 Claims, 8 Drawing Sheets

(51) Int. Cl.
    *H04L 9/30*         (2006.01)
    *H04L 9/32*         (2006.01)

(52) U.S. Cl.
    CPC .......... *H04L 9/3073* (2013.01); *H04L 9/3247* (2013.01); *G06F 2221/033* (2013.01)

(56) References Cited

U.S. PATENT DOCUMENTS

| | | | |
|---|---|---|---|
| 2002/0191797 A1 | 12/2002 | Perlman | |
| 2008/0072068 A1 | 3/2008 | Wang et al. | |
| 2008/0195871 A1 | 8/2008 | Peinado et al. | |
| 2009/0288160 A1* | 11/2009 | Esliger | G06F 21/572 |
| | | | 726/17 |
| 2012/0131345 A1 | 5/2012 | Dadu et al. | |
| 2015/0180840 A1* | 6/2015 | Jung | H04L 9/3247 |
| | | | 713/150 |
| 2016/0359620 A1 | 12/2016 | Pebay-Peyroula | |
| 2017/0180386 A1* | 6/2017 | Dewan | G09C 1/00 |
| 2017/0249155 A1* | 8/2017 | Sundrani | G11C 11/005 |
| 2017/0372073 A1 | 12/2017 | Gunti et al. | |
| 2018/0101388 A1* | 4/2018 | Hummel | G06F 9/441 |
| 2018/0330095 A1* | 11/2018 | Packer Ali | H04L 9/3247 |
| 2019/0042229 A1 | 2/2019 | Kotary et al. | |
| 2019/0073478 A1 | 3/2019 | Khessib et al. | |
| 2019/0095627 A1* | 3/2019 | Oh | G06F 21/53 |
| 2019/0356529 A1 | 11/2019 | Gulati | |
| 2020/0195061 A1 | 6/2020 | Montero | |
| 2020/0401676 A1 | 12/2020 | Lai et al. | |
| 2021/0200874 A1* | 7/2021 | Markey | H04L 9/0643 |
| 2021/0236921 A1 | 8/2021 | Seibert et al. | |
| 2022/0113960 A1 | 4/2022 | Moran et al. | |
| 2022/0272552 A1 | 8/2022 | Chan et al. | |
| 2022/0292206 A1* | 9/2022 | Bieger | G06F 21/57 |
| 2023/0107953 A1 | 4/2023 | Guan | |
| 2023/0125134 A1 | 4/2023 | Raleigh et al. | |
| 2023/0161881 A1 | 5/2023 | Perez et al. | |

OTHER PUBLICATIONS

Silicon Labs. "UG103.6: Bootloader Fundamentals", Jun. 2020. (Year: 2020).*
Silicon Labs. "UG103.05: IoT Endpoint Security Fundamentals", Dec. 2020. (Year: 2020).*
Gwata, Ngonidzashe. "Bootloaders in embedded systems", Mar. 2023. Retrieved from <https://medium.com/@ngonidzashegwt/bootloaders-in-embedded-systems-9f9513132177>. (Year: 2023).*
Gao et al., "Microcontroller Based IoT System Firmware Security: Case Studies," IEEE International Conference on Industrial Internet (ICII), Orlando, FL, USA, 2019, pp. 200-209.
Holz et al., "Trust and Trustworthy Computing," 7th International Conference, Trust 2014 Heraklion, Crete, Greece, Jun. 30-Jul. 2, 2014 Proceedings, 236 pages.
Notice of Allowance for U.S. Appl. No. 18/191,748 dated Jul. 25, 2023, 10 pages.
Notice of Allowance for U.S. Appl. No. 18/191,748 dated Sep. 18, 2023, 7 pages.

\* cited by examiner

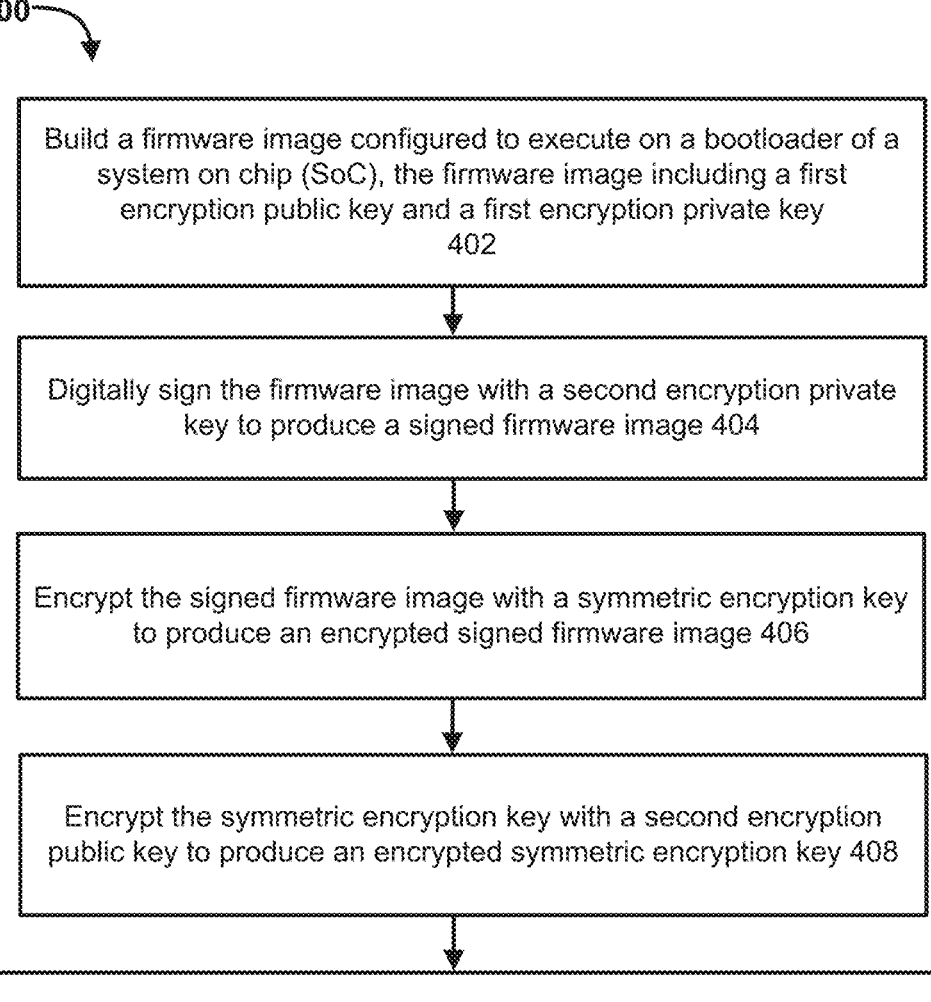

400

Build a firmware image configured to execute on a bootloader of a system on chip (SoC), the firmware image including a first encryption public key and a first encryption private key
402

Digitally sign the firmware image with a second encryption private key to produce a signed firmware image 404

Encrypt the signed firmware image with a symmetric encryption key to produce an encrypted signed firmware image 406

Encrypt the symmetric encryption key with a second encryption public key to produce an encrypted symmetric encryption key 408

Send the encrypted signed firmware image and the encrypted symmetric encryption key [green] to the SoC to cause the SoC to (1) decrypt the encrypted symmetric encryption key to produce the symmetric encryption key using a third encryption private key that is included in an asymmetric key pair that includes the second encryption public key, (2) decrypt the encrypted signed firmware image to produce the signed firmware image using the symmetric encryption key, (3) verify a digital signature of the signed firmware image using a third encryption public key that is included in an asymmetric key pair that includes the second encryption private key.
410

FIG. 4

Receive an encrypted symmetric encryption key and an encrypted signed firmware image that includes a first encryption public key and a first encryption private key
502

Decrypt the encrypted symmetric encryption key to produce the symmetric encryption key using a third encryption private key that is included in an asymmetric key pair that includes the second encryption public key
504

Decrypt the encrypted signed firmware image to produce the signed firmware image using the symmetric encryption key 506

Verify a digital signature of the signed firmware image using a third encryption public key that is included in an asymmetric key pair that includes the second encryption private key
508

FIG. 5

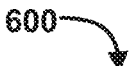

600

Receive, at a bootloader of a system on chip (SoC), an
encrypted symmetric encryption key and an encrypted
signed firmware image
602

Decrypt the encrypted symmetric encryption key to produce
the symmetric encryption key using a third encryption private
key that is included in an asymmetric key pair that includes
the second encryption public key
604

Decrypt the encrypted signed firmware image to produce the
signed firmware image using the symmetric encryption key
606

Verify a digital signature of the signed firmware image using
a third encryption public key that is included in an
asymmetric key pair that includes the second encryption
private key
608

Execute, after verifying the signed firmware image, the
firmware image 610

FIG. 6

MICROCONTROLLER UNIT (MCU) SECURE BOOT

CROSS-REFERENCE TO RELATED TO APPLICATIONS

This application is a Continuation of U.S. patent application Ser. No. 18/191,748, filed Mar. 28, 2023, now U.S. Pat. No. 11,836,255, and titled "Microcontroller Unit (MCU) Secure Boot," the entire content of which is hereby incorporated by reference herein in its entirety.

FIELD

The present disclosure generally relates to bootloader technologies for compute devices, and more specifically, to secure methods for deployment of firmware to surveillance cameras and other devices.

BACKGROUND

A bootloader is a software application stored in memory of a compute device that loads an operating system and/or other computer programs into the memory upon startup of the compute device. The operating system and/or other computer programs can be part of a firmware image of the compute device.

SUMMARY

In some embodiments, an apparatus includes a processor and a memory storing instructions to cause the processor to execute a method. The method includes building a firmware image to execute on a bootloader of a system on chip (SoC), the firmware image including first encryption public and private keys, and digitally signing the firmware image with a second encryption private key. The method also includes encrypting the signed firmware image with a symmetric encryption key and encrypting the symmetric encryption key with a second encryption public key. The method also includes sending the encrypted signed firmware image and the encrypted symmetric encryption key to the SoC to cause the SoC to (1) decrypt the encrypted symmetric encryption key to produce the symmetric encryption key using a third encryption private key that is included in an asymmetric key pair that includes the second encryption public key, (2) decrypt the encrypted signed firmware image to produce the signed firmware image using the symmetric encryption key, and (3) verify a digital signature of the signed firmware image using a third encryption public key that is included in an asymmetric key pair that includes the second encryption private key.

In some embodiments, an apparatus includes at least one processor of a system on chip (SoC) that includes a host portion and a bootloader, and a memory. The memory is coupled to the at least one processor and stores instructions configured to cause the at least one processor to receive an encrypted symmetric encryption key and an encrypted signed firmware image that includes a first encryption public key and a first encryption private key. The encrypted symmetric encryption key is a symmetric encryption key encrypted with a second encryption public key. The encrypted signed firmware image is a signed firmware image encrypted with the symmetric encryption key. The signed firmware image is a firmware image digitally signed with a second encryption private key. The memory also stores instructions configured to cause the at least one processor to decrypt the encrypted symmetric encryption key to produce the symmetric encryption key using a third encryption private key that is included in an asymmetric key pair that includes the second encryption public key. The memory also stores instructions configured to cause the at least one processor to decrypt the encrypted signed firmware image to produce the signed firmware image using the symmetric encryption key, and to verify a digital signature of the signed firmware image using a third encryption public key that is included in an asymmetric key pair that includes the second encryption private key.

In some embodiments, a non-transitory processor-readable medium stores code representing processor-executable instructions to cause the one or more processors to receive, at a bootloader of a system on chip (SoC), an encrypted symmetric encryption key and an encrypted signed firmware image. The encrypted symmetric encryption key is a symmetric encryption key. The encrypted signed firmware image is a signed firmware image encrypted with the symmetric encryption key. The signed firmware image is a firmware image digitally signed with a second encryption private key. The non-transitory processor-readable medium also stores code representing processor-executable instructions to cause the one or more processors to decrypt the encrypted symmetric encryption key to produce the symmetric encryption key using a third encryption private key that is included in an asymmetric key pair that includes the second encryption public key. The non-transitory processor-readable medium also stores code representing processor-executable instructions to cause the one or more processors to decrypt the encrypted signed firmware image to produce the signed firmware image using the symmetric encryption key. The non-transitory processor-readable medium also stores code representing processor-executable instructions to cause the one or more processors to verify a digital signature of the signed firmware image using a third encryption public key that is included in an asymmetric key pair that includes the second encryption private key, and to execute, after verifying the signed firmware image, the firmware image.

BRIEF DESCRIPTION OF THE DRAWINGS

FIG. 4 is a flow diagram of a method for generating and securely transmitting a firmware image according to some embodiments.

FIG. 5 is a flow diagram of a method for generating and securely transmitting a firmware image according to some embodiments.

FIG. 6 is a flow diagram of a method for generating and securely transmitting a firmware image according to some embodiments.

DETAILED DESCRIPTION

Some embodiments set forth herein include methods for secure streaming of microcontroller unit (MCU) firmware images to an embedded bootloader from a system on chip (SoC), or a host thereof, on startup. For example, a firmware image to be executed by the MCU may be compiled and stored inside a firmware image for a SoC. Once the SoC securely boots up, the SoC (e.g., via a host software application) causes the MCU to enter an embedded bootloader mode, streams the firmware image into a random access memory (RAM) of the MCU, and instructs the MCU to begin executing out of RAM. Such methods can be used, for example, to ensure that, assuming the SoC is secure, only trusted/proprietary firmware can be run on the MCU. Moreover, depending on the implementation, embodiments of the present disclosure can prevent firmware from being accessed by unauthorized third parties, and/or can facilitate firmware updates that are faster and more efficient than known methods.

Figure 1:
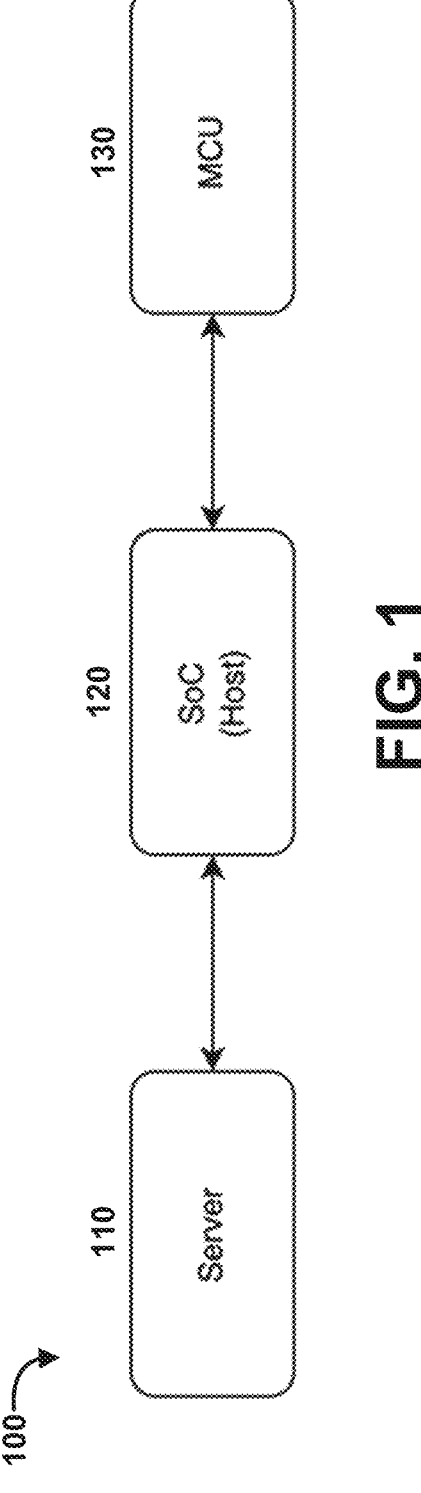
FIG. 1 is a diagram of a system for secure booting of a microcontroller unit (MCU), according to some embodiments.

FIG. 1 is a diagram of a system for secure booting of a microcontroller unit (MCU), according to some embodiments. The system 100 of FIG. 1 includes a server 110, a MCU 130, and an intermediating SoC 120. As used herein, MCU refers to a processor that does not include an operating system, and firmware refers to code for execution on the MCU. The SoC 120 is a main processor that is responsible for managing the execution of firmware on the MCU 130 (optionally via a "host" software application). Optionally, the SoC runs embedded Linux. During operation of the system 100, the server 110 sends a software update to the SoC 120, which may perform one or more verification steps to assess the validity of the software update.

In some implementations, a firmware image is encrypted on server 110 and is stored in encrypted form. The encrypted firmware image can be packaged as part of a filesystem image that is sent to SoC 120 as part of a software upgrade/update process. The encrypted firmware image is, in turn, sent to a bootloader of MCU 130. The bootloader can decrypt the encrypted firmware image using an encrypted image decryption key, which the bootloader acquires by decrypting the encrypted image decryption key using an image decryption transport private key that is written to the internal memory of the bootloader (e.g., during manufacture/"build" of the bootloader). In some such implementations, the firmware image exists in decrypted form only during the build process (e.g., on the server 110) and on the MCU 130 itself while the firmware image is being executed.

As used herein, bootloader refers to firmware that runs on the MCU 130 and is responsible for receiving the firmware image from the SoC 120/host and executing the firmware image. The bootloader can be protected from modification, for example by storing it in read-only memory (ROM) or by locking the debug port (since, in some instances, the debug port is the only external interface by which the flash memory inside the MCU can be modified). As used herein, ROM refers to memory that cannot be erased or modified once written to.

In some implementations, to ensure that the firmware running on a MCU 130 is authorized/proprietary, communications between the SoC 120 and the MCU 130 can be encrypted such that only the authorized/proprietary firmware can decrypt messages sent by the SoC 120 and encrypt the responses to the messages (e.g., with a key that is stored within secure storage onboard the SoC 120). Alternatively or in addition, an image signature of the firmware image may be checked/verified prior to execution.

In some implementations, a firmware update includes at least two partitions (e.g., if the bootloader is operating in application mode). For example, when firmware is received by the application and subsequently transferred to the bootloader to implement the booting logic, if the firmware update is defective, unauthorized, or otherwise "bad," it could brick the MCU 130. To address this issue, two firmware update partitions may be sent-one for storing a "known-good" firmware image and the other for an upgrade/update firmware image. In this manner, if a firmware upgrade/update image turns out to be bad, the known-good image can be used/executed.

Embodiments set forth herein can significantly simplify the logic (e.g., reduce the computational load) involved in firmware upgrade/update procedures. For example, since the bootloader is operating in "stand-alone" mode (e.g., without an operating system installed upon startup) and is always present on the MCU 130, it can be relied upon to successfully receive the firmware from the host. Moreover, the writing and execution of the firmware image can be performed directly from volatile RAM (i.e., memory that is volatile and that is erased on reset/reboot), such that when the MCU 130 first boots up, no code is available to execute other than the bootloader, which relies on the host/SoC 120 completely.

Figure 2:
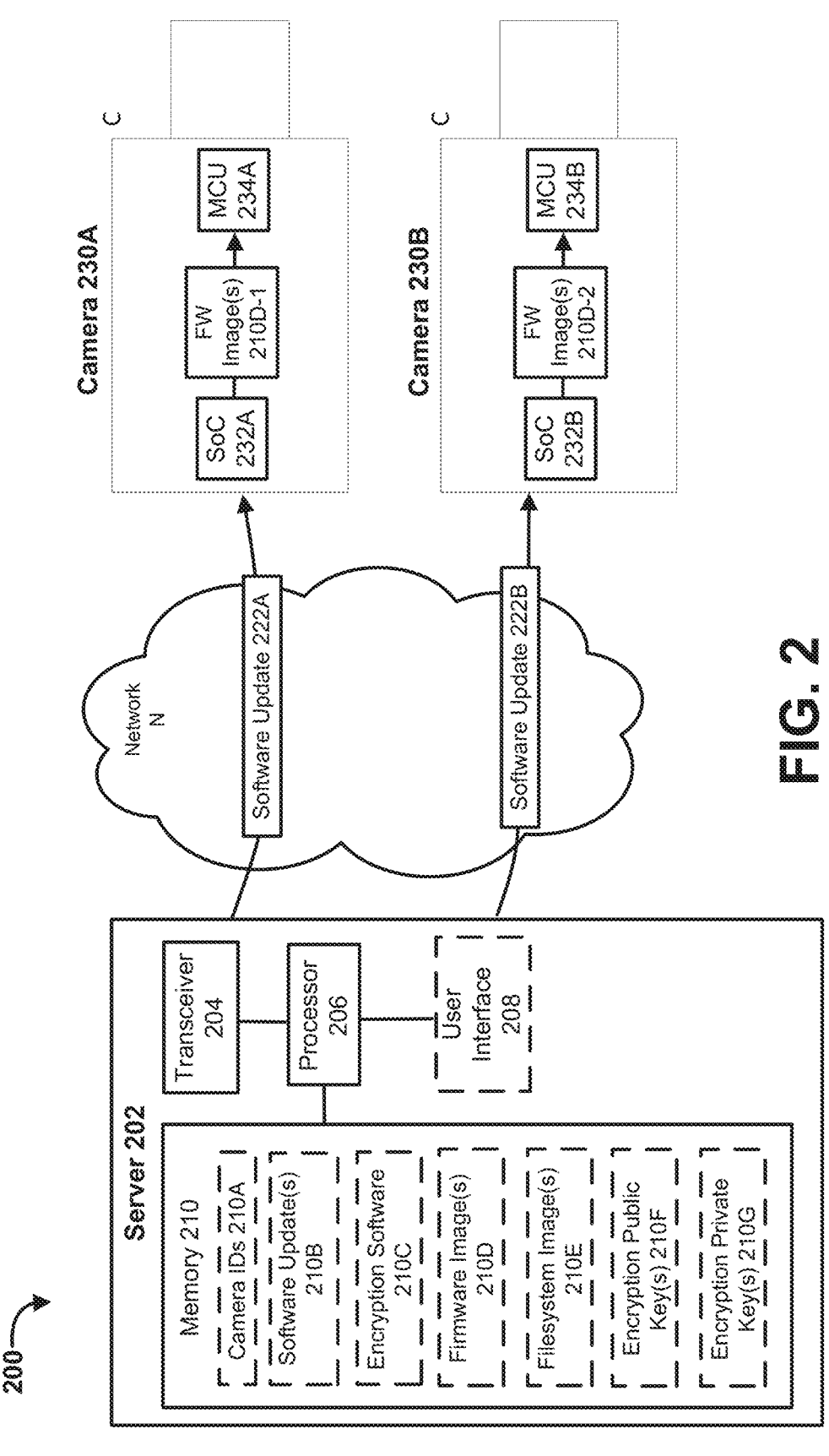
FIG. 2 is a detailed diagram of a system for secure booting of a MCU, according to some embodiments.

FIG. 2 is a detailed diagram of a system for secure booting of a MCU, according to some embodiments. As shown in FIG. 2, the system 200 includes a server 202 and a plurality of cameras 230A, 230B in operable communication with one another via a wired or wireless telecommunications network "N." The server 202 includes a memory 210, a transceiver 204, and optionally a user interface 208, each operably coupled to a processor 206. Each of cameras 230A, 230B includes a SoC (232A, 232B respectively) and a MCU (234A, 234B, respectively). During operation, a software update 222A is sent from the server 202 to camera 230A, and a software update 222B is sent from the server 202 to camera 230B. The software update 222A may be different from, or the same as, software update 222B. For example, camera 230A may have a first associated attribute (e.g., model type, serial number, firmware history, etc.) and the software update 222A may be selected/built by the server 202 based on the first attribute. Similarly, camera 230B may have a second associated attribute (e.g., model type, serial number, firmware history, etc.), which may be the same as or different from the first attribute, and the software update 222B may be selected/built by the server 202 based on the second attribute. When the software updates 222A, 222B are received at the SoCs (232A and 232B, respectively), each of the SoC's 232A, 232B, in response to receiving the software updates 222A, 222B, can identify and transmit firmware image(s) (210D-1 and 210D-2, respectively) to the respective MCUs (234A, 234B), for execution thereon. The firmware image(s) 210D-1, 210D-2 may include one or more updates or upgrades. Alternatively, the firmware image(s) 210D-1, 210D-2 may be the same or similar to a firmware version previously executed by the MCU 234A, 234B.

Figure 3A:
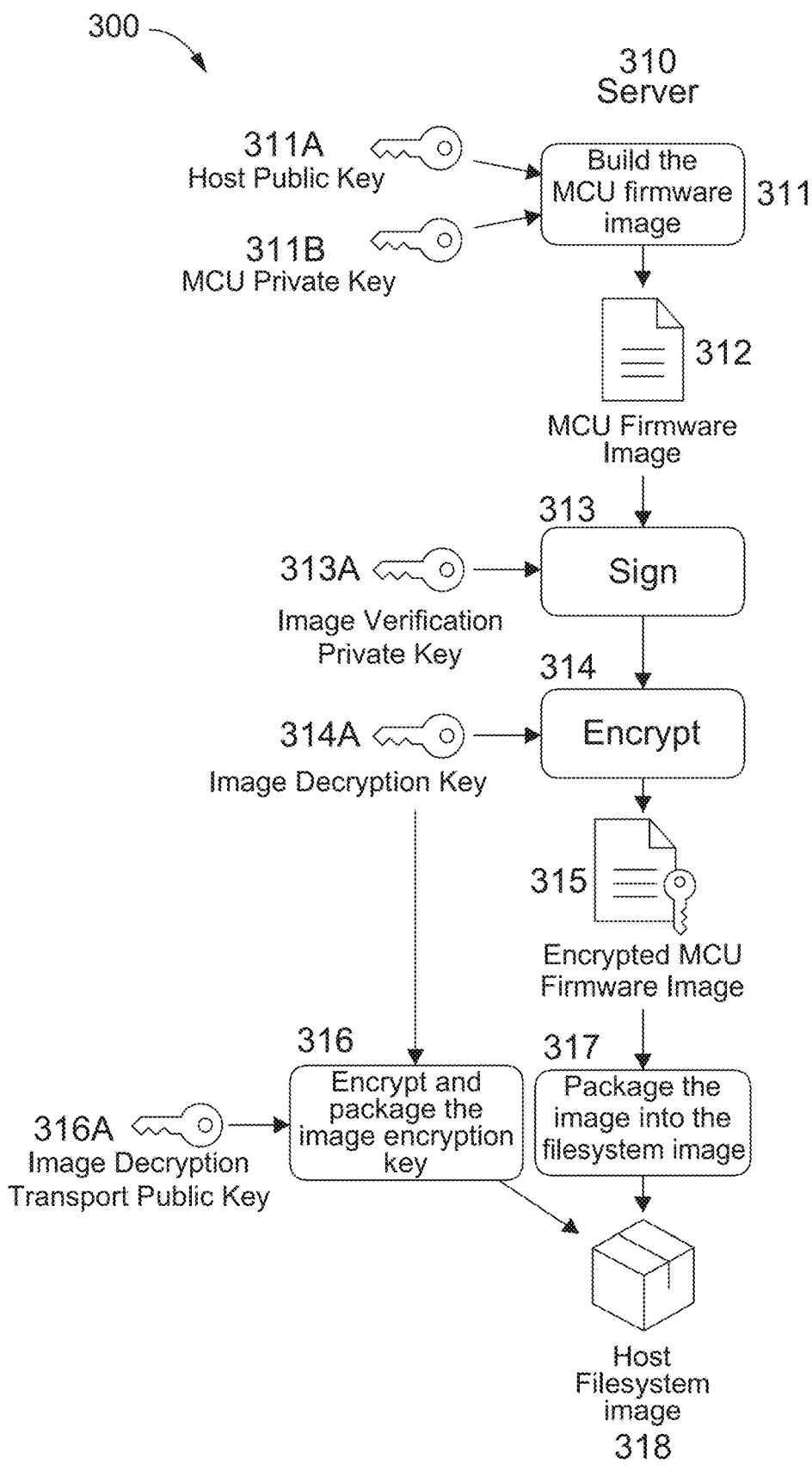
FIGS. 3A-3C are diagrams showing processes performed by a server, a host system on chip (SoC), and an MCU, according to some embodiments.
Figure 3B:
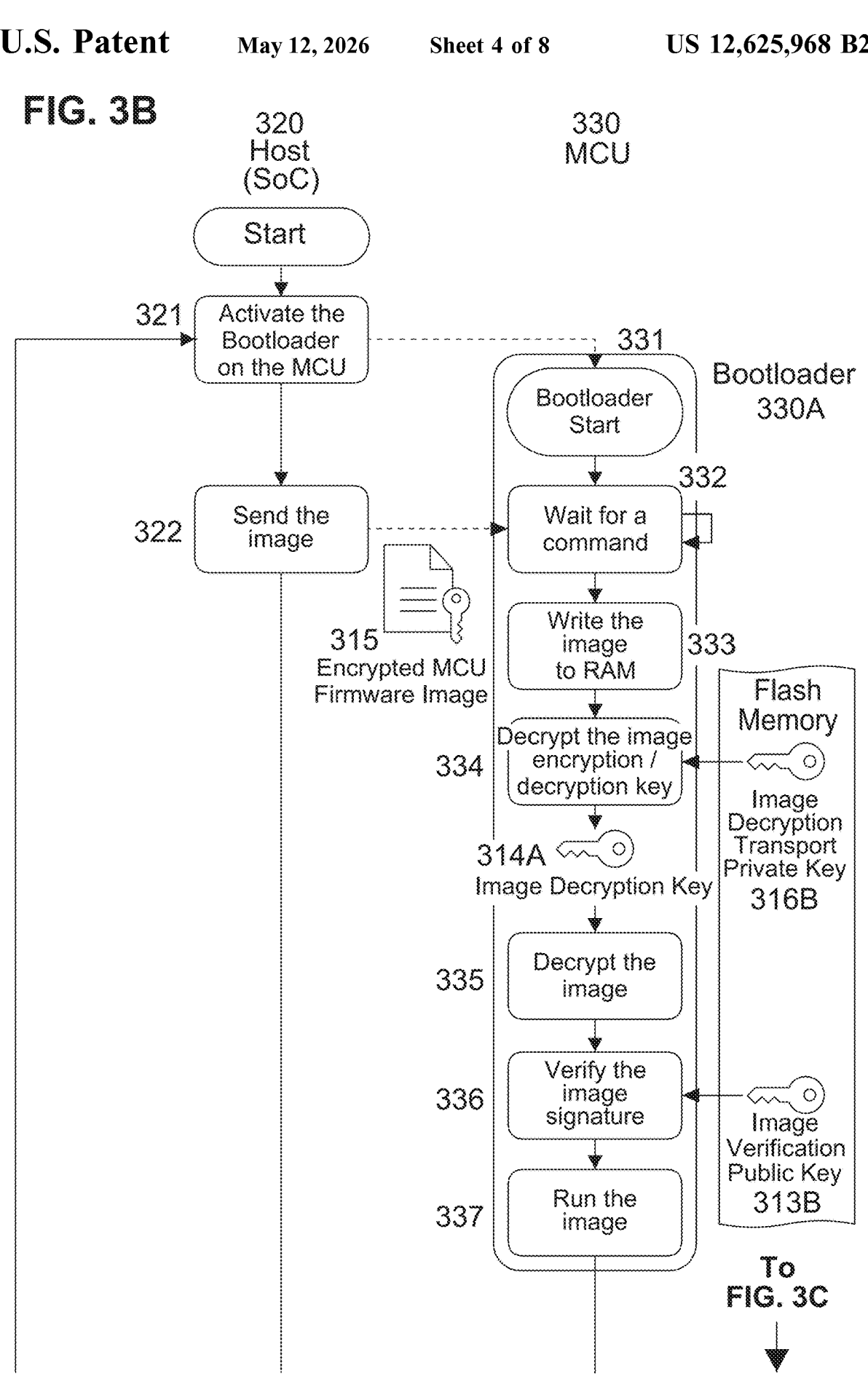
Figure 3C:
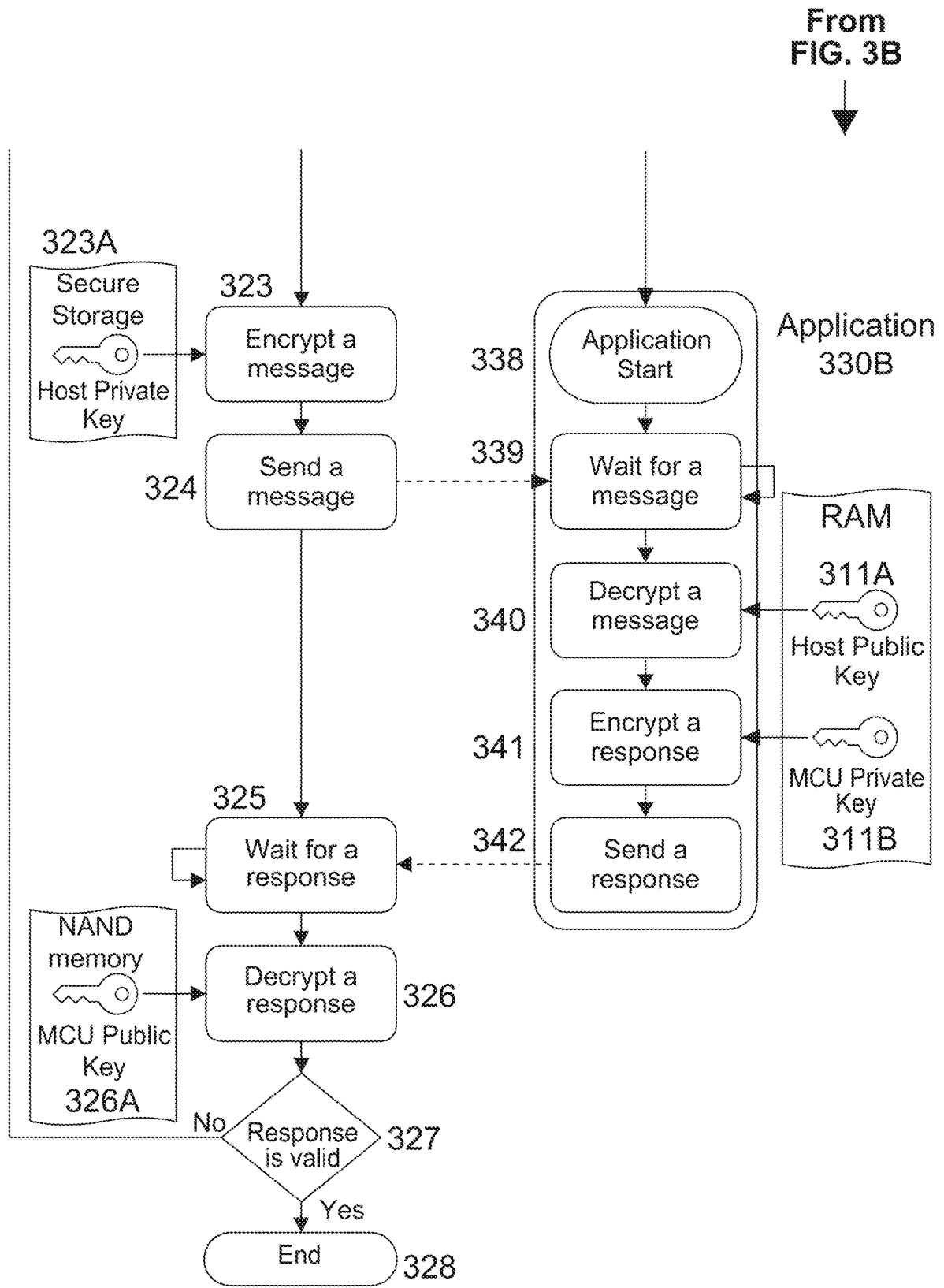

FIGS. 3A-3C are diagrams showing processes performed by a server (e.g., server 110 of FIG. 1 or server 202 of FIG. 2), a host/system on chip (SoC) (e.g., SoC 232A, 232B of FIG. 2), and an MCU (e.g., MCU 234A, 234B of FIG. 2), according to some embodiments. As shown in FIGS. 3A-3C, the processes 300 include the server 310 building/generating a MCU firmware image at 311, to produce the MCU firmware image 312. The MCU firmware image is signed at 313, using an image verification private key 313A. The signed firmware image is then encrypted, at 314, using an image decryption key 314A, to produce an encrypted MCU firmware image 315. The image decryption key 314A is also (optionally in parallel or overlapping in time with the encryption 314) separately encrypted and packaged at 316 (e.g., into a host filesystem image 318), using an image decryption transport public key 316A. At 317, the encrypted MCU firmware image 315 is packaged into a host filesystem image 318, optionally in combination with the encrypted and packaged image decryption key. The server 310 then transmits a signal representing the host filesystem image to the host/SoC 320. The signal representing the host filesystem image can include a representation of the encrypted and packaged image decryption key (and, optionally, the image decryption transport private key 316B). Alternatively, the signal representing the host filesystem image is a first signal, and the server 310 further transmits a second signal representing the encrypted and packaged image decryption key (and, optionally, the image decryption transport private key 316B) to the host/SoC 320.

The host/SoC 320 activates the bootloader, at 321, on the MCU 330 (e.g., in response to receiving the first and/or second signal discussed above) by sending a signal to the MCU 330, and more specifically, to a bootloader 330A of the MCU 330. In response to receiving the activation signal, the bootloader starts, at 331, on the MCU 330 and then waits for a command at 332. The host/SoC 320 sends the encrypted MCU firmware image 315 and the image decryption key, at 322, to the bootloader 330A. In response to receiving the encrypted MCU firmware image 315 (and/or in response to receiving the image decryption key), the bootloader 330A writes the encrypted MCU firmware image 315 (and/or image decryption key) to RAM at 333, and decrypts the encrypted MCU firmware image 315 using the image decryption key 314A (identified using the image decryption transport private key 316B, which is in flash memory and is optionally received from the host/SoC 320). The image decryption transport public key 316A and image decryption transport private key 316B can be used for the encryption and decryption, respectively, of the firmware image. Using the image decryption key 314A, the bootloader 330A decrypts the MCU firmware image 315, at 335, and verifies one or more signatures of the decrypted MCU firmware image 315 using an image verification public kay 313B (optionally received from the host/SoC 320). The image verification public key 313B can be used for verifying one or more signatures of the firmware image. At 337, the bootloader 330A runs/executes the decrypted MCU firmware image, which in turn triggers execution of a software application(s) 330B (see "application start" 338), also referred to herein as entering into an "application mode" of the bootloader 330A. The software application 330B then waits for a message, at 339. The host/SoC 320 encrypts a message at 323, using a host private key 323A held in a secure storage of the host/SoC 320, and sends the encrypted message to the software application 330B, at 324. The host private key 323A can be used for the encryption of messages sent by the host/SoC 320.

In response to receiving the encrypted message, the software application 330B decrypts the encrypted message at 340, using a host public key 311A stored in RAM. The software application 330B then encrypts a response to the message, at 341, using a MCU private key 311B stored in RAM, and sends the encrypted response, at 342, to the host/SoC 320 (which is waiting for a response, at 325). In response to receiving the encrypted response, the host/SoC 320 decrypts the encrypted response at 326, using a MCU public key 326A (e.g., stored in NAND memory of the host/SoC 320), to identify/recover the response. The MCU private key 341A and MCU public key 326A can be used for the encryption and decryption, respectively, of the messages sent by the MCU 330 to the host/SoC 320. At 327, a determination is made by the host/SoC 320 as to whether the response is valid. If the response is deemed valid at 327, the deployment of the firmware update/upgrade is successfully completed, and the processes 300 ends (328). If the response is deemed invalid at 327, the procedure 300 loops back to the bootloader activation step at 321, and the processes for host/SoC 320 and MCU 330 are repeated.

Although the processes 300 of FIGS. 3A-3C are shown and described as including one software application 330B, in some implementations multiple software applications may be involved in the processes 300, e.g., within a given MCU 330 and/or across multiple cameras (or other compute devices) having associated MCUs. Where multiple software applications are involved, the same host public key 311A and/or MCU private key 311B may be used for each of the multiple software application. Alternatively, each software application from the multiple software applications may receive/use a different associated host public key from a plurality of host public keys, and a different MCU private key from a plurality of MCU private keys.

FIG. 4 is a flow diagram of a method 400 for generating and securely transmitting a firmware image, according to some embodiments. The method 400 of FIG. 4 can be implemented, for example, using any of systems 100, 200, or 300 of FIGS. 1, 2, and 3A-3C, respectively. As shown in FIG. 4, the method 400 includes building a firmware image to execute on a bootloader of a system on chip (SoC), at 402. The firmware image includes a first encryption public key (e.g., the host public key 311A of FIG. 3A) and a first encryption private key (e.g., the MCU private key 311B of FIG. 3A). The method 400 also includes digitally signing the firmware image, at 404, with a second encryption private key (e.g., the image verification private key 313A of FIG. 3A), to produce a signed firmware image. The method 400 also includes encrypting the signed firmware image, at 406, with a symmetric encryption key (e.g., the image decryption key 314A of FIG. 3A) to produce an encrypted signed firmware image, and encrypting the symmetric encryption key at 408 with a second encryption public key (e.g., the image decryption transport public key 316A of FIG. 3A) to produce an encrypted symmetric encryption key. The method 400 also includes sending the encrypted signed firmware image and the encrypted symmetric encryption key (e.g., collectively the host filesystem image 318 of FIG. 3A), at 410, to the SoC to cause the SoC to (1) decrypt the encrypted symmetric encryption key to produce the symmetric decryption key using a third decryption private key (e.g., the image decryption transport private key 316B) that is included in an asymmetric key pair that includes the second encryption public key, (2) decrypt the encrypted signed firmware image to produce the signed firmware image using the symmetric decryption key, and (3) verify a digital signature of the signed firmware image using a third encryption public key (e.g., the image verification public key 313B) that is included in an asymmetric key pair that includes the second encryption private key.

In some implementations, each of (1) the asymmetric key pair including the third encryption private key and the second encryption public key and (2) the asymmetric key pair including the second encryption private key and third encryption public key, is unique to the SoC and not used with another SoC.

In some implementations, the memory also stores instructions configured to cause the processor to store the second encryption public key in the memory before the processor executes the instruction to build the firmware image, the second encryption public key being defined by a manufacturer of the SoC. The third encryption private key can be defined by the manufacturer of the SoC and stored at the SoC before the encrypted signed firmware image is sent (e.g., at step 410 of FIG. 4). In some implementations, the first encryption public key is included in an asymmetric key pair that includes a fourth encryption private key used by a host portion of the SoC to encrypt a first message to the bootloader operating in an application mode. The first encryption private key can be included in an asymmetric key pair that includes a fourth encryption public key used by the host portion of the SoC to decrypt a second message from the bootloader operating in the application mode.

FIG. 5 is a flow diagram of a method for generating and securely transmitting a firmware image according to some embodiments. The method 500 of FIG. 5 can be implemented, for example, using any of systems 100, 200, or 300 of FIGS. 1, 2, and 3A-3C, respectively. More specifically, the method 500 of FIG. 5 can be performed using at least one processor of a system on chip (SoC) that includes a host portion, a bootloader, and a memory. The method 500 includes receiving an encrypted symmetric encryption key and an encrypted signed firmware image that includes a first encryption public key (e.g., the host public key 311A of FIG. 3A) and a first encryption private key (e.g., the MCU private key 311B of FIG. 3A) (e.g., collectively, the host filesystem image 318 of FIG. 3A). The encrypted symmetric encryption key is a symmetric encryption key encrypted with a second encryption public key. The encrypted signed firmware image is a signed firmware image encrypted with the symmetric encryption key. The signed firmware image is a firmware image digitally signed with a second encryption private key. The method 500 also includes decrypting the encrypted symmetric encryption key, at 504, to produce the symmetric encryption key using a third encryption private key (e.g., the image decryption transport private key 316B of FIG. 3B) that is included in an asymmetric key pair that includes the second encryption public key (e.g., the image decryption transport public key 316A of FIG. 3A). The method 500 also includes decrypting the encrypted signed firmware image, at 506, to produce the signed firmware image using a symmetric decryption key (e.g., the image decryption transport private key 316B of FIG. 3B), and at 508, verifying a digital signature of the signed firmware image using a third encryption public key (e.g., the image verification public key 313B of FIG. 3B) that is included in an asymmetric key pair that includes the second encryption private key (e.g., the image verification private key 313A of FIG. 3A).

In some implementations, the method 500 also includes encrypting a first message to produce a first encrypted message using a fourth encryption private key that is included in an asymmetric key pair that includes the first encryption public key, and sending the first encrypted message from the host portion of the SoC to the bootloader to cause the bootloader to decrypt the first encrypted message to produce the first message using the first encryption public key.

In some implementations, the method 500 also includes encrypting a first message to produce a first encrypted message using a fourth encryption private key that is included in an asymmetric key pair that includes the first encryption public key. The first encrypted message is sent from the host portion of the SoC to the bootloader to cause the bootloader to decrypt the first encrypted message to produce the first message using the first encryption public key. At the host portion of the SoC and from the bootloader, a second encrypted message is received, the second encrypted message being produced at the bootloader by encrypting a second message using the first private encryption key that is included in an asymmetric key pair that includes a fourth encryption public key. The second encrypted message is then decrypted, at the host portion of the SoC, using the fourth encryption public key to produce the second message.

In some implementations, the bootloader is configured to operate in a stand-alone mode while the host portion of the SoC is operating and to receive the encrypted symmetric encryption key and an encrypted signed firmware image while the host portion of the SoC is operating.

In some implementations, the SoC includes a volatile random access memory (RAM), and the method also includes storing the encrypted symmetric encryption key and the encrypted signed firmware image in the volatile RAM in response to the encrypted symmetric encryption key and the encrypted signed firmware image being received.

In some implementations, the SoC includes a volatile random access memory (RAM), and code is executed in the bootloader and not executed in any remaining portion of the SoC. The bootloader may be stored in a read only memory (ROM). A debug port of the SoC may be locked (e.g., via software that prevents data from being received at or sent from the debug port) to prevent modification of the bootloader.

FIG. 6 is a flow diagram of a method 600 for generating and securely transmitting a firmware image according to some embodiments. The method 600 of FIG. 6 can be implemented, for example, using any of systems 100, 200, or 300 of FIGS. 1, 2, and 3A-3C, respectively. For example, a non-transitory processor-readable medium of any of systems 100, 200, or 300 may store code representing processor-executable instructions to cause one or more processors to perform the method 600 of FIG. 6. The method 600 includes receiving, at 602 and at a bootloader of a system on chip (SoC), a symmetric encryption key (e.g., image decryption key 314A of FIG. 3A) that has been encrypted, and an encrypted signed firmware image (e.g., the encrypted MCU firmware image 315 of FIG. 3A) (e.g., collectively, the host filesystem image 318 of FIG. 3A). The encrypted symmetric encryption key is a symmetric encryption key. The encrypted signed firmware image is a signed firmware image encrypted with the symmetric encryption key. The signed firmware image is a firmware image digitally signed with a second encryption private key. The method 600 also includes decrypting the encrypted symmetric encryption key, at 604, to produce the symmetric decryption key using a third decryption private key (e.g., the image decryption transport private key 316B of FIG. 3B) that is included in an asymmetric key pair that includes the second encryption public key (e.g., the image verification public key 313B of FIG. 3B). At 606, the encrypted signed firmware image is decrypted to produce the signed firmware image using the symmetric encryption key. The method 600 also includes verifying a digital signature of the signed firmware image, at 608, using a third encryption public key (e.g., the image verification public key 313B of FIG. 3B) that is included in an asymmetric key pair that includes the second encryption private key (e.g., the image verification private key 313A of FIG. 3A), and executing the firmware image, after verifying the signed firmware image, at 610.

In some implementations, the method 600 also includes executing, after verifying the signed firmware image, an application (e.g., the application mode of the bootloader) that includes receiving a first encrypted message at the bootloader from a host portion of the SoC and sending a second encrypted message from the bootloader to the host portion of the SoC.

In some implementations, the encrypted signed firmware image includes a first encryption public key and a first encryption private key. The first encryption public key and a fourth encryption private key may form an asymmetric key pair, and the first encryption private key and a fourth encryption public key may form an asymmetric key pair. The method 600 can also include receiving a first encrypted message at the bootloader from a host portion of the SoC, decrypting the first encrypted message using the first encryption public key to form a first message, encrypting a second message using the first encryption private key to form a second encrypted message, and sending the second encrypted message from the bootloader to the host portion of the SoC.

In some implementations, the encrypted signed firmware image includes a first encryption public key and a first encryption private key, the first encryption public key and a fourth encryption private key forming an asymmetric key pair, and the first encryption private key and a fourth encryption public key forming an asymmetric key pair. The method 600 can also include receiving, at the bootloader from a host portion of the SoC, a first encrypted message encrypted by the host portion of the SoC using the fourth encryption private key, and decrypting the first encrypted message using the first encryption public key to form a first message. A second message is encrypted using the first encryption private key to form a second encrypted message, and the second encrypted message is sent from the bootloader to the host portion of the SoC to cause the host portion of the SoC to decrypt the second encrypted message using the fourth encryption public key.

In some implementations, the bootloader is configured to operate in a stand-alone mode while a host portion of the SoC is operating and to receive the encrypted symmetric encryption key and an encrypted signed firmware image while the host portion of the SoC is operating.

In some implementations, the encrypted symmetric encryption key and the encrypted signed firmware image are received from a host portion of the SoC after the bootloader has been activated by the host portion of the SoC.

In some implementations, the SoC includes a volatile random access memory (RAM), and the instructions also include code to cause the one or more processors to store the encrypted symmetric encryption key and encrypted signed firmware image in the volatile RAM in response to the encrypted symmetric encryption key and the encrypted signed firmware image being received at the bootloader.

In some implementations, the bootloader is stored in a read only memory (ROM) or a debug port of the SoC is locked to prevent modification of the bootloader.

One or more embodiments set forth herein facilitate enhanced security boots on a host SoC, with secure delivery of encrypted firmware images. The encrypted firmware images are bootable by an MCU, and are cryptographically signed. In some implementations, the host SoC includes a bootloader and no other software application(s), and retrieves/receives code from the MCU. Messages exchanged between the host SoC and the MCU can also be encrypted, such that if, for example, the MCU has been tampered with in any way, or swapped out, it will be apparent (e.g., because the message cannot be decrypted). Depending on the implementation, one or more keys described herein may have been stored on the associated compute device during manufacture of the compute device. Alternatively or in addition, one or more keys described herein may be device-specific (e.g., uniquely associated with the compute device on which they are present). By using asymmetric keys as described herein, private keys can be maintained on the compute device(s) with which they are associated, and may not be exportable from those compute device(s). As such, third parties cannot determine what the private keys are, and only the public keys are "harvested by" (i.e., transmitted by) the compute device(s).

In some implementations, the bootloader is kept in a volatile memory of the MCU, and is not present in/retained by the MCU when the MCU is off. Alternatively or in addition, the bootloader is not "updateable," in that its image is read-only, thereby reducing the surface area available for third-party attacks.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EE-PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
a processor; and
a memory coupled to the processor and storing instructions configured to cause the processor to:
generate a firmware image including a first encryption public key and a first encryption private key; and
cause transmission of (1) an encrypted signed version of the firmware image generated using a second encryption private key, and (2) an encrypted symmetric encryption key to a system on chip (SoC), to cause the SoC to (i) decrypt the encrypted symmetric encryption key to produce a symmetric encryption key, (ii) decrypt the encrypted signed version of the firmware image to produce a signed firmware image using the symmetric encryption key, and (iii) verify a digital signature of the signed firmware image using an asymmetric key pair that includes the second encryption private key, the first encryption public key included in an asymmetric key pair that includes a third encryption private key configured for use by a host portion of the SoC to encrypt a first message to a bootloader of the SoC when the bootloader is operating in an application mode.

2. The apparatus of claim 1, wherein the asymmetric key pair that includes the second encryption private key is unique to the SoC and not used with another SoC.

3. The apparatus of claim 1, wherein the memory further stores instructions configured to cause the processor to:
store a second encryption public key in the memory before the processor executes the instruction to generate the firmware image, the second encryption public key being defined by a manufacturer of the SoC.

4. The apparatus of claim 1, wherein:
the first encryption private key is included in an asymmetric key pair that includes a second encryption public key configured for use by the host portion of the SoC to decrypt a second message from the bootloader operating in the application mode.

5. An apparatus, comprising:

at least one processor of a system on chip (SoC); and a memory coupled to the at least one processor and storing instructions configured to cause the at least one processor to:

receive an encrypted symmetric encryption key and an encrypted signed firmware image that includes a first encryption public key and a first encryption private key;

encrypt a first message to produce a first encrypted message using a third encryption private key that is included in an asymmetric key pair that includes the first encryption public key;

send the first encrypted message from a host portion of the SoC to a bootloader of the SoC;

the encrypted symmetric encryption key being a symmetric encryption key encrypted with a second encryption public key;

decrypt the encrypted symmetric encryption key to produce the symmetric encryption key;

decrypt the encrypted signed firmware image to produce a signed firmware image using the symmetric encryption key; and verify a digital signature of the signed firmware image using an asymmetric key pair that includes a second encryption private key.

6. The apparatus of claim 5, wherein sending the first encrypted message from the host portion of the SoC to the bootloader of the SoC causes the bootloader to decrypt the first encrypted message to produce the first message using the first encryption public key.

7. The apparatus of claim 5, wherein the bootloader of the SoC is configured to operate in a stand-alone mode while the host portion of the SoC is operating, and to receive the encrypted symmetric encryption key and the encrypted signed firmware image while the host portion of the SoC is operating.

8. The apparatus of claim 5, wherein:

the SoC includes a volatile random access memory (RAM), and the memory further stores instructions to cause the at least one processor to store the encrypted symmetric encryption key and the encrypted signed firmware image in the volatile RAM in response to the encrypted symmetric encryption key and the encrypted signed firmware image being received.

9. The apparatus of claim 5, wherein:

the SoC includes a volatile random access memory (RAM), and the at least one processor is configured to execute code in the bootloader of the SoC and not execute code in any remaining portion of the SoC.

10. The apparatus of claim 5, wherein the memory is a read only memory (ROM), and the bootloader of the SoC is stored in the ROM.

11. The apparatus of claim 5, wherein a debug port of the SoC is locked to prevent modification of the bootloader of the SoC.

12. A non-transitory processor-readable medium storing code representing processor-executable instructions to cause one or more processors to:

receive, at a system on chip (SoC), an encrypted symmetric encryption key and an encrypted signed firmware image;

decrypt the encrypted symmetric encryption key to produce a symmetric encryption key using an encryption private key that is included in a first asymmetric key pair;

decrypt the encrypted signed firmware image to produce a signed firmware image using the symmetric encryption key;

verify a digital signature of the signed firmware image using an encryption public key that is included in a second asymmetric key pair different from the first asymmetric key pair;

execute, after verifying the signed firmware image, a firmware image; and execute an application including receiving a first encrypted message at a bootloader of the SoC and from a host portion of the SoC and sending a second encrypted message from the bootloader to the host portion of the SoC.

13. The non-transitory processor-readable medium of claim 12, wherein executing the application occurs after verifying the signed firmware image.

14. The non-transitory processor-readable medium of claim 12, wherein the encryption public key is a first encryption public key and the encryption private key is a first encryption private key, the instructions further comprising code to cause the one or more processors to:

decrypt the first encrypted message using a second encryption public key to form a first message; and encrypt a second message using a second encryption private key to form the second encrypted message.

15. The non-transitory processor-readable medium of claim 12, wherein the encryption public key is a first encryption public key, the encryption private key is a first encryption private key, and the first encrypted message is encrypted by the host portion of the SoC using a second encryption private key, the instructions further comprising code to cause the one or more processors to:

decrypt the first encrypted message using a second encryption public key to form a first message;

encrypt a second message using a third encryption private key to form the second encrypted message; and the host portion of the SoC to decrypt the second encrypted message using a third encryption public key.

16. The non-transitory processor-readable medium of claim 12, wherein the bootloader of the SoC is configured to operate in a stand-alone mode while the host portion of the SoC is operating, and to receive the encrypted symmetric encryption key and the encrypted signed firmware image while the host portion of the SoC is operating.

17. The non-transitory processor-readable medium of claim 12, wherein the encrypted symmetric encryption key and the encrypted signed firmware image are received from the host portion of the SoC after the bootloader of the SoC has been activated by the host portion of the SoC.

18. The non-transitory processor-readable medium of claim 12, wherein the SoC includes a volatile random access memory (RAM), the instructions further comprising code to cause the one or more processors to:

store the encrypted symmetric encryption key and the encrypted signed firmware image in the volatile RAM in response to the encrypted symmetric encryption key and the encrypted signed firmware image being received at the bootloader of the SoC.

19. The non-transitory processor-readable medium of claim 12, wherein at least one of:

the bootloader of the SoC is stored in a read only memory (ROM), or a debug port of the SoC is locked to prevent modification of the bootloader.

* * * * *